May 12, 1970  A. L. GOOD  3,511,278
PNEUMATIC CONTROL SYSTEM AND PNEUMATICALLY OPERATED
ACTUATOR THEREFOR OR THE LIKE
Filed March 15, 1968  2 Sheets-Sheet 1

INVENTOR
ARTHUR L. GOOD

BY Candor & Candor

HIS ATTORNEYS

INVENTOR
ARTHUR L. GOOD

BY Candor & Candor

HIS ATTORNEYS

United States Patent Office 3,511,278
Patented May 12, 1970

3,511,278
PNEUMATIC CONTROL SYSTEM AND PNEUMATICALLY OPERATED ACTUATOR THEREFOR OR THE LIKE
Arthur L. Good, Elkhart, Ind., assignor to Robertshaw Controls Company, Richmond, Va., a corporation of Delaware
Filed Mar. 15, 1968, Ser. No. 713,367
Int. Cl. F16k 31/12
U.S. Cl. 137—624.14
20 Claims

ABSTRACT OF THE DISCLOSURE

This disclosure relates to a pneumatically operated actuator means that has a movable wall defining a chamber of the actuator, the actuator having first and second passage means leading to the chamber and having means for opening one of the passage means while closing the other passage means when the movable wall is in one position and for closing the one passage means and opening the other passage means while interconnecting the two passage means together when the movable wall is in another position thereof so as to interconnect a pneumatic source at the second passage means to the first passage means.

---

This invention relates to a pneumatically operated control system as well as to a pneumatically operated actuator that can be utilized for such a control system or the like.

It is well known that control systems for domestic appliances and the like have included a pneumatically operated control arrangement comprising a plurality of pneumatically operated actuators which can be sequentially interconnected to and disconnected from a pneumatic source in a predetermined manner so that each actuator means when actuated will cause a particular function to occur in the apparatus or the like.

This invention provides such a control system or the like wherein a pneumatically operated actuator means can be utilized to interconnect a pneumatic source to various pneumatically operated actuators when the actuator means is actuated and can act as a timing means so that if a particular actuator in the system does not perform its intended function or the like within a predetermined time period, the pneumatically operated actuator means of this invention will disconnect the pneumatic source from the other actuators.

In particular, the pneumatically operated timing actuator of this invention has a movable wall defining a chamber within the housing means of the actuator, the chamber being interconnected to the pneumatic source by one passage means of the actuator and to the remaining actuators of the system by another passage means. The movable wall is operatively interconnected to a valve arrangement of the actuator in such a manner that when the movable wall is in a deactuated position thereof, the valve means opens the passage means leading from the pneumatic source to the chamber of the actuator while closing the passage means leading to the other actuators. The source now being interconnected to the chamber of the actuator will cause the movable wall to move to an actuated position thereof and cause the valve means of the actuator to close the passage means leading from the pneumatic source to the chamber while opening the other passage means and interconnecting the source passage means to the other passage means in order to directly interconnect the source to the other actuators to actuate the same. The timing actuator while in this actuated condition has means for subsequently deactuating the same to disconnect the source from the other actuators if after a predetermined period of time, one of the actuators does not perform its intended function as will be apparent hereinafter.

Accordingly, it is an object of this invention to provide an improved pneumatically operated control system having one or more of the novel features set forth above or hereinafter shown or described.

Another object of this invention is to provide an improved pneumatically operated actuator for such a control system or the like, the pneumatically operated actuator having one or more of the novel features set forth above or hereinafter shown or described.

Other objects, uses and advantages of this invention are apparent from a reading of this description which proceeds with reference to the accompanying drawings forming a part thereof and wherein.

Figure 1:
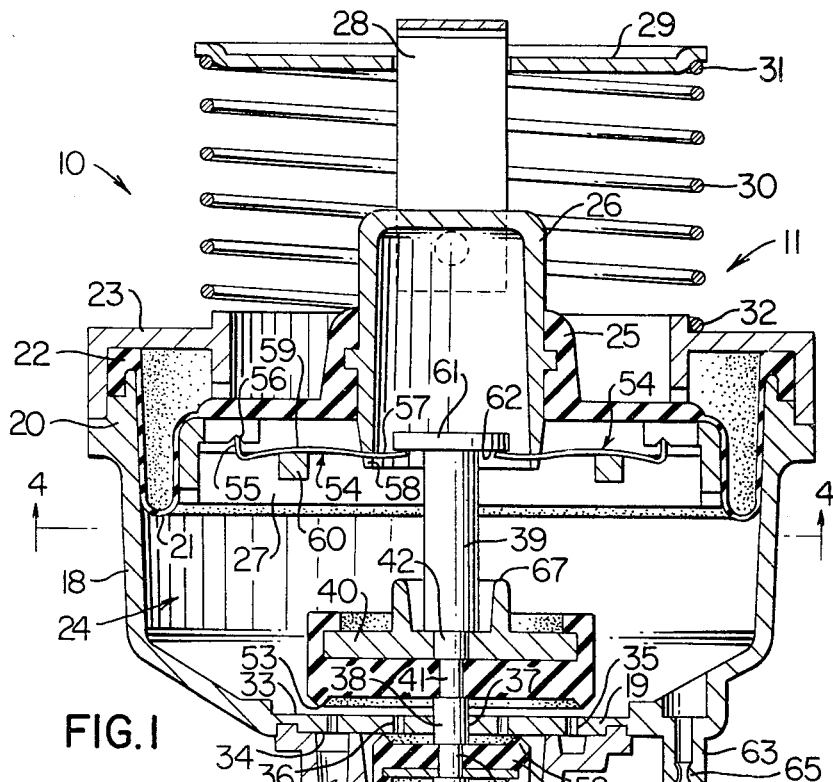
FIG. 1 is a schematic, cross-sectional view of the pneumatically operated actuator and control system of this invention, the pneumatically operated actuator being taken substantially on line 1—1 of FIG. 3 and being enlarged.

While the various features of this invention are hereinafter illustrated and described as being particularly adaptable for providing a timing means for a control system or the like, it is to be understood that the various features of this invention can be utilized singly or in any combination thereof to provide penumatically operated actuator means for other purposes as desired.

Therefore, this invention is not to be limited to only the embodiment illustrated in the drawings, because the drawings are merely utilized to illustrate one of the wide variety of uses of this invention.

Figure 2:
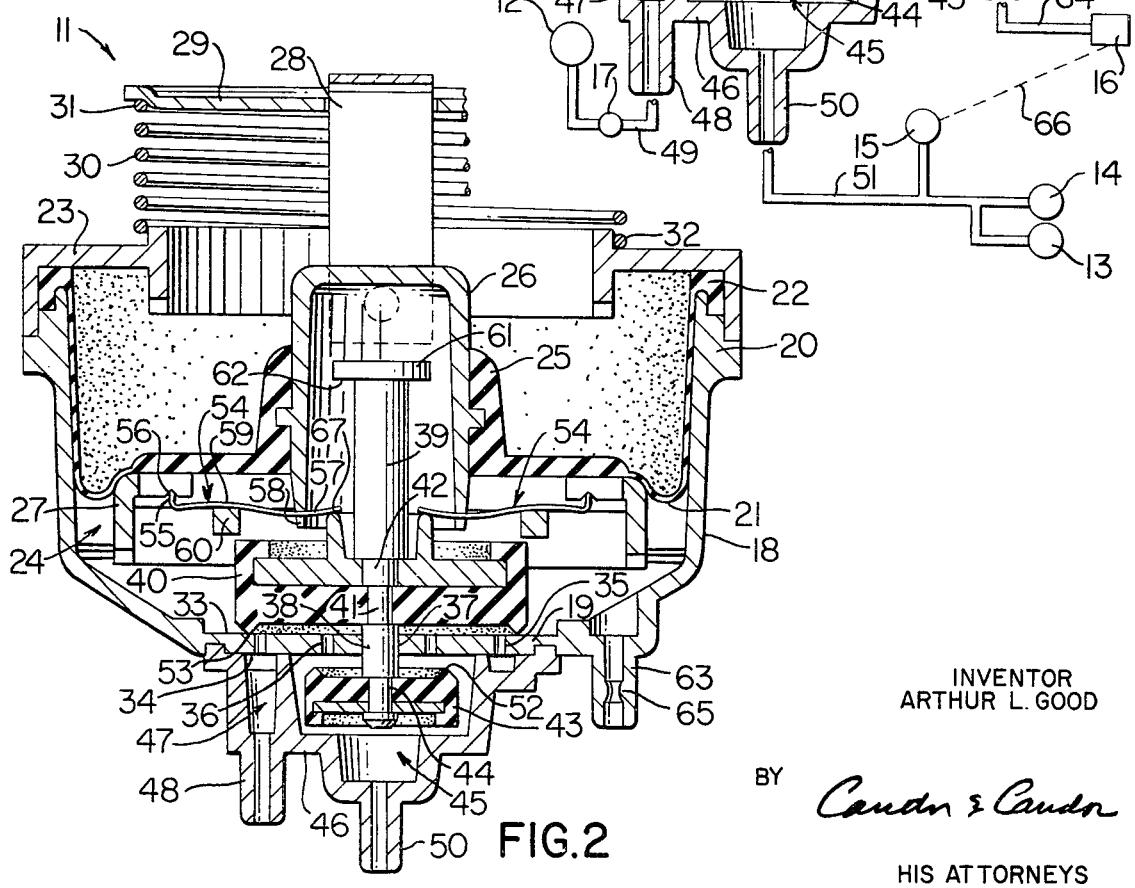
FIG. 2 is a view similar to FIG. 1 and illustrates the actuator of FIG. 1 in its actuated position.
Figure 3:
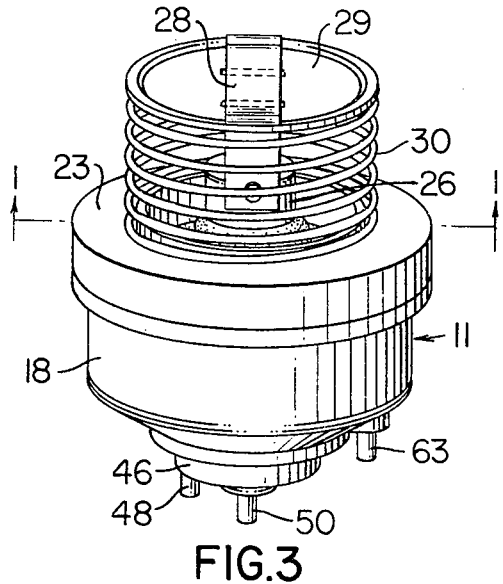
FIG. 3 is a top perspective view of the actuator of FIG. 1 and is in reduced size.
Figure 5:
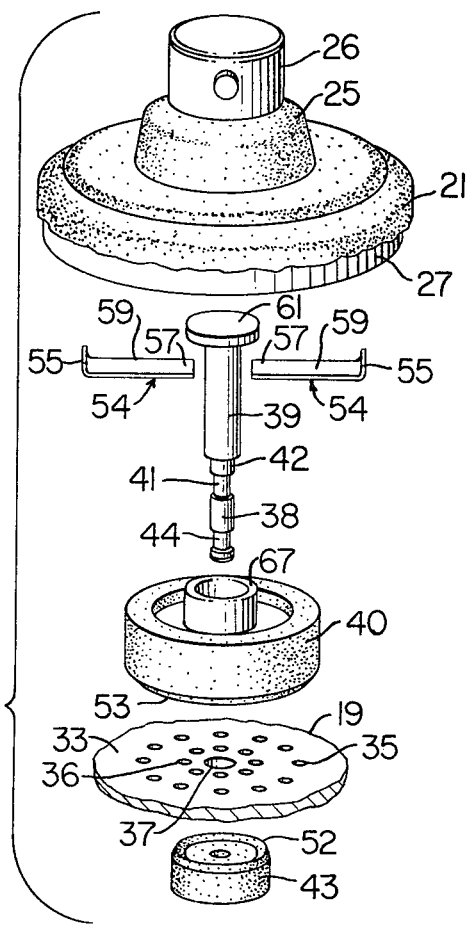
FIG. 5 is an exploded perspective view of certain parts of the actuator of FIG. 1.
Figure 4:
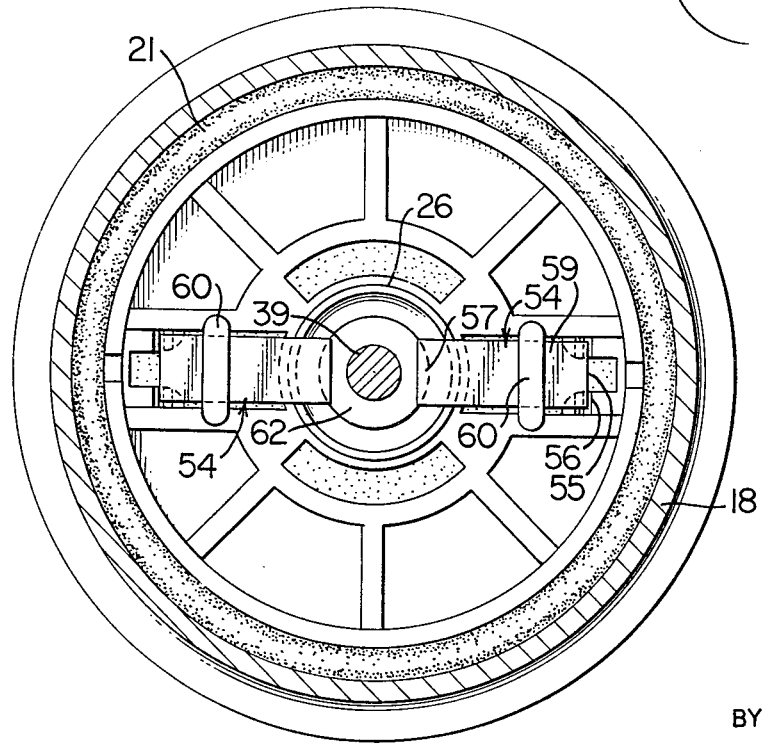
FIG. 4 is a cross-sectional view of the actuator of FIG. 1 and is taken substantially on line 4—4 thereof.

Referring now to FIG. 1, the pneumatically operated control system of this invention is generally indicated by the reference numeral 10 and comprises a pneumatically operated actuator 11 of this invention being utilized as a means for interconnecting a pneumatic source 12 to a plurality of penumatically operated actuator means 13, 14 and 15 when the actuator 11 is disposed in the actuated position of FIG. 2 and to disconnect the source 12 from the actuators 13 and 15 when the actuator 11 is in the deactuated position of FIG. 1.

As will be apparent hereinafter, the actuator 11 of this invention also acts as a timing means so that when the actuator 11 is disposed in the actuated condition of FIG. 2, the same will interconnect the pneumatic source 12 to the actuators 13, 14 and 15 and if the actuator 15 performs its proper actuated function in controlling a device 16 in a manner hereinafter described, the actuator 11 will remain in the actuated condition of FIG. 2 until the control system is turned off by a manual selector means 17. However, if the actuator 15 does not perform its function after a predetermined time period following the initial actuation of the actuator 11, the device 16 will cause automatic deactuation of the actuator 11 so that the same will return to the position illustrated in FIG. 1 to disconnect the pneumatic source 12 from the pneumatically operated actuators 13, 14 and 15 for a purpose hereinafter described.

The pneumatically operated actuator 11 of this invention comprises a substantially cup-shaped housing member 18 having a closed flat end wall 19 and an opposed open end 20 closed by a flexible diaphragm 21 having its outer periphery 22 secured to the open end 20 of the cup-shaped housing member 18 by another housing member 23 secured to the housing member 18 in any suitable manner whereby the flexible diaphragm or movable wall means 21 of the actuator 11 cooperates with the housing member 18 to define a chamber 24 therebetween. The inner periphery 25 of the flexible diaphragm 21 is secured to an actuating post means 26 interconnected to a diaphragm back-up plate means 27 disposed in the chamber 24 against the diaphragm 21.

The actuating post means 26 is secured to an extension 28 that carries a spring retaining plate or disc 29 at the outer end thereof. A compression spring 30 is disposed between the plate 29 and the housing member 23 so that one end 31 of the compression spring 30 bears against the plate 29 and the other end 32 thereof bears against the housing member 23 to tend to hold the flexible diaphragm 21 and actuating post means 26 in the deactuated position illustrated in FIG. 1, the housing member 23 providing suitable stop means for limiting the upward position of the diaphragm 21.

The flat end wall 19 of the cup-shaped housing member 18 has its opposed flat surfaces 33 and 34 respectively interrupted by a plurality of circularly arranged passage means 35 concentrically disposed about another set of circularly arranged passage means 36 also respectively interrupting the opposed surfaces 33 and 34 of the end wall 19 and being concentrically disposed about a central aperture 37 passing through the end wall 19 and telescopically receiving an enlarged cylindrical section 38 of a valve stem 39.

The valve stem 39 carries a first valve member 40 on reduced sections 41 and 42 thereof so that the valve member 40 is disposed in the chamber 24, the valve stem 39 carrying another valve member 43 on a reduced section 44 thereof so as to be disposed outside the chamber 24 and disposed in another chamber 45 defined between the housing member 18 and another housing member 46 secured thereto in any suitable manner. The housing member 46 cooperates with the end wall 19 of the housing member 18 to define an annular chamber 47 disposed in fluid communication with the passage means 35 in the end wall 19 and separated from the chamber 45 that is disposed in fluid communication with the passage means 36 in the end wall 19. A tubular extension or nipple 48 projects from the housing member 46 and is adapted to be disposed in fluid communication with the pneumatic source 12 by a flexible conduit means 49 or the like while being in direct fluid communication with the chamber 47. Similarly, a tubular extension or nipple means 50 extends from the housing member 36 and is adapted to place the chamber 45 in fluid communication with the pneumatically operated actuator means 13, 14 and 15 by flexible conduit means 51 or the like.

The valve member 43 has an annular ridge or valve face 52 adapted to seat against the under surface 34 of the end wall 19 so as to seal the passage means 36 from the chamber 45 and, thus, from the conduit means 51 when the actuator 11 is disposed in the deactuated condition of FIG. 1. The other valve member 40 has an annular ridge or valve face 53 adapted to seal against the upper surface 33 of the end wall 19 to seal the passage means 35 from the chamber 24 of the actuator 11 while interconnecting the passage means 35 to the passage means 36 through the space between the end wall 19 and the valve member 40 when the valve member 40 is disposed in the actuated position illustrated in FIG. 2 in a manner hereinafter described.

A pair of leaf-like spring members 54 are carried by the back-up plate 27 and respectively have bent outer ends 55 received in notches 56 of the back-up plate 27 and have the inner ends 57 thereof engaging against the end 58 of the actuating post 26 and extending radially inwardly therefrom while the intermediate parts 59 are bowed over abutment means 60 of the back-up plate 27 to secure the spring members 54 thereto.

The valve stem 39 has a disc-like member 61 at the outer end thereof provided with an under surface 62 adapted to be engaged by the ends 57 of the spring fingers 54 in the manner illustrated in FIG. 1 so as to raise and hold the valve stem 39 in the position illustrated in FIG. 1 as long as the actuator 11 is in its deactuated condition whereby the valve member 40 is disposed away from the upper surface 33 of the end wall 19 and the valve member 43 is disposed against the under surface 34 of the end wall 19. Thus, the passage means 35 are open to the chamber 24 by the valve member 40 and the passage means 36 are closed by the valve member 43 so that the chamber 24 is disconnected from the chamber 45 that leads to the actuator means 13, 14 and 15.

The housing member 18 has a tubular extension or nipple means 63 projecting therefrom in offset relation to the end wall 19 so as not to be affected by the operation of the valve means 40, 43, the nipple means 63 interconnecting the chamber 24 of the actuator 11 to a conduit means 64 leading to the control device 16. The nipple means 63 can have a restriction 65 disposed therein to restrict the fluid communication between the chamber 24 and the conduit means 64 for a purpose hereinafter described.

In particular, the control device 16 in its deactuated condition interconnects the atmosphere to the conduit 64 and will disconnect the conduit 64 from the atmosphere when the actuator 15 is properly actuated by being interconnected to the source 12 and actuates the device 16, the actuator 15 being interconnected to the control device 16 by suitable tieing or linkage means 66 for a purpose hereinafter described.

The operation of the control system 10 utilizing the pneumatically operated timer actuating means 11 of this invention will now be described.

Assuming that the control system 10 is in the condition illustrated in FIG. 1 and that the pneumatic source 12 is a vacuum source, such as a vacuum pump or the like, the operator desiring to operate the actuators 13, 14 and 15 to produce desired results thereof, turns the selector means 17 to a position that interconnects the source 12 with the chamber 47 of the actuator 11 whereby the vacuum source 12 will begin to evacuate the chamber 24. In this manner the resulting pressure differential across the diaphragm 21 will cause the diaphragm 21 to begin to move downwardly from the position illustrated in FIG. 1 toward the position illustrated in FIG. 2 in opposition to the force of the compression spring 30. As the diaphragm 21 moves vertically downwardly, the valve stem 39 remains in the position illustrated in FIG. 1 because the pressure differential across the valve member 43 will maintain the valve member 43 in the position illustrated in FIG. 1 to prevent the chamber 24 from being interconnected to the conduit 51 leading to the actuators 13, 14 and 15.

Even though the deactuated control device 16 is interconnecting the conduit 64 to the atmosphere, the restriction 65 in the nipple means 63 controls the bleed of air into the evacuating chamber 24 in such a manner that the bleed of air does not effect the evacuation thereof by the interconnected vacuum source 12 so that the diaphragm 21 continues to move vertically downwardly to the position illustrated in FIG. 2 where the inner ends 57 of the spring fingers 54 engage against an annular projection 67 on the valve member 40 to move the valve stem 39 and valve members 40 and 43 vertically downwardly therewith to the position illustrated in FIG. 2. In this position, the valve member 40 seals the passage means 35 from the chamber 24 and the valve member 43 opens the passage means 36 so that the vacuum source 12 is now interconnected through the passage means 35 and 36 to the chamber 45 of the housing member 46 and, thus, to the conduit means 51 to actuate the actuators 13, 14 and 15. During such downward movement of the diaphragm 21 to the position illustrated in FIG. 2, any further downward overtravel of the diaphragm 21 is absorbed by the flexing of the spring fingers 54 against the annular projection 67.

With the vacuum source 12 now interconnected to the actuators 13, 14 and 15 by the actuated actuator 11, the actuators 13, 14 and 15 can accomplish their intended function with the actuator 15, through the tying means 66, operating the control device 16. If the control device 16 is properly operated by the actuated actuator 15, the control device 16 will disconnect the conduit 64 from the atmosphere so that no air can bleed into the chamber 24 and the diaphragm 21 of the actuator 11 will remain in the condition illustrated in FIG. 2 to continuously interconnect the vacuum source 12 to the actuator means 13, 14 and 15 until the operator operates the selector means 17 to disconnect the source 12 from the actuator 11.

However, if when the actuator 11 is initially disposed in the actuated condition of FIG. 2 so as to interconnect the source 12 to the actuator 15 and the actuator 15 does not function properly to cause the control device 16 to disconnect the atmosphere from the conduit 64, it can be seen that the atmosphere is adapted to continuously bleed in a controlled manner through the restriction 65 into the chamber 24 of the actuator 11.

When such bleed of air into the chamber 24 reaches a predetermined degree, the force of the compression spring 30 overcomes the now diminished pressure differential across the diaphragm 21 to pull the diaphragm 21 vertically upwardly toward the position illustrated in FIG. 1 whereby the spring fingers 54 will engage against the under surface 62 of the stem disc 61 and raise the stem 39 therewith so that the valve members 40 and 43 will be moved from the position illustrated in FIG. 2 back to the position illustrated in FIG. 1 to close the passages 36 and, thereby, disconnect the source 12 from the actuators 13, 14 and 15 while interconnecting the source 12 to the chamber 24 so that the actuators 13, 14 and 15 cannot be operated until the actuator 11 is again actuated to the position illustrated in FIG. 2.

Therefore, it can be seen that this invention provides an improved pneumatic control system wherein the pneumatic source can only be interconnected to a plurality of pneumatically operated actuator means when a pneumatically operated actuator of this invention has been moved to its actuated position and which can, thereafter, act as a timer means so as to disconnect the source from the pneumatically operated actuators if during a predetermined lapse of time, a particular operating function of the control system does not take place.

Further, it can be seen that this invention provides an improved pneumatically operated actuator that can be utilized in such a control system or the like.

What is claimed is:

1. In combination, a pneumatic source, and a pneumatically operated actuator, said actuator having a movable wall means cooperating therewith to define a chamber in said actuator, said actuator having a first passage means leading from said chamber and having a second passage means leading from said source to said chamber, said actuator having operating means for closing said first passage means while opening said second passage means when said movable wall means is in one position thereof whereby said source is interconnected to said chamber to cause said wall means to move from said one position thereof to another position thereof, said operating means opening said first passage means and closing said second passage means from communication with said chamber while interconnecting said second passage means to said first passage means when said wall means is in said other position thereof to interconnect said source to said first passage means, said actuator having a stationary wall provided with opposed sides and with said first and second passage means passing therethrough, said operating means acting only again one side of said stationary wall when said movable wall means is in its said one position and acting only against the other side of said stationary wall when said movable wall means is in its said other position.

2. A combination as set forth in claim 1 wherein said movable wall means comprises a flexible diaphragm.

3. A combination as set forth in claim 1 wherein said source is a vacuum source.

4. A combination as set forth in claim 1 wherein said operating means comprises a pair of interconnected valve members respectively controlling said first and second passage means.

5. A combination as set forth claim 4 wherein one of said valve members closes said second passage means from said chamber and has means fluidly interconnecting said second passage means to said first passage means when said wall means is in said other position thereof.

6. A combination as set forth in claim 1 wherein said actuator has a third passage means leading to said chamber and is unaffected by said operating means.

7. A combination as set forth in claim 1 wherein spring means is carried by said actuator and is operatively interconnected to said movable wall means to tend to maintain said wall means in said one position thereof.

8. In combination, a pneumatic source, and a pneumatically operated actuator, said actuator having a movable wall means cooperating therewith to define a chamber in said actuator, said actuator having a first passage means leading from said chamber and having a second passage means leading from said source to said chamber, said actuator having operating means for closing said first passage means while opening said second passage means when said movable wall means is in one position thereof whereby said source is interconnected to said chamber to cause said wall means to move from said one position thereof to another position thereof, said operating means opening said first passage means and closing said second passage means from communication with said chamber while interconnecting said second passage means to said first passage means when said wall means is in said other position thereof to interconnect said source to said first passage means, said actuator having a third passage means leading to said chamber and being unaffected by said operating means, and a restriction means provided in said third passage means to restrict fluid flow therethrough.

9. A pneumatically operated actuator comprising housing means, a movable wall means carried by said housing means and defining a chamber therewith, said housing means having a first passage means leading to said chamber and having a second passage means leading to said chamber, first means carried by said housing means to close said first passage means from said chamber when in one position thereof and to open said first passage means when in another position thereof, and second means carried by said housing means to open said second passage means to said chamber when in one position thereof and to close said second passage means from said chamber while interconnecting said second passage means to said first passage means when in another position thereof, said movable wall means having means for moving said first and second means to said one position thereof when said wall means is in one position thereof and for moving said first and second means to said other positions thereof when said wall means is in another position thereof, said actuator having a third passage means leading to said chamber and being unaffected by said first and second means, and a restriction means provided in said third passage means to restrict fluid flow therethrough.

10. A pneumatically operated actuator comprising housing means, a movable wall means carried by said housing means and defining a chamber therewith, said housing means having a first passage means leading to said chamber and having a second passage means leading to said chamber, first means carried by said housing means to close said first passage means from said chamber when in one position theerof and to open said first passage means when in another position thereof, and second means carried by said housing means to open said second passage means to said chamber when in one position thereof and to close said second passage means from said chamber while interconnecting said second passage means to said first passage means when in another position thereof, said movable wall means having means for moving said first and second means to said one position thereof when said wall means is in one position thereof and for moving said first and second means to said other positions thereof when said wall means is in another position thereof, said housing means having a wall having said passage means passing therethrough, said first means being disposed on one side of said wall and said second means being disposed on the other side of said wall.

11. A pneumatically operated actuator as set forth in claim 10 wherein said first means and said second means are interconnected together by an interconnection means, said wall of said housing means having an opening passing therethrough and telescopically receiving said interconnection means.

12. A pneumatically operated actuator as set forth in claim 10 wherein said second means comprises a valve member cooperable with said housing wall to seal said second passage means from said chamber when said second means is in said other position thereof, said valve member having means to fluidly bridge said second passage means with said first passage means when said second means is in said other position thereof.

13. A pneumatically operated actuator as set forth in claim 12 wherein said first means comprises a valve member cooperable with said housing wall to close said first passage means when said first means is in said one position thereof.

14. A pneumatically operated actuator as set forth in claim 10 wherein said movable wall means comprises a flexible diaphragm.

15. A pneumatically operated actuator as set forth in claim 10 wherein said first means comprises a valve member.

16. A pneumatically operated actuator as set forth in claim 15 wherein said second means comprises a valve member.

17. A pneumatically operated actuator as set forth in claim 16 wherein said two valve members are interconnected together to move in unison.

18. A pneumatically operated actuator as set forth in claim 10 wherein said actuator has a third passage means leading to said chamber and is unaffected by said first and second means.

19. A pneumatically operated actuator as set forth in claim 18 wherein a restriction means is provided in said third passage means to restrict fluid flow therethrough.

20. A pneumatically operated actuator as set forth in claim 10 wherein spring means is carried by said actuator and is operatively interconnected to said movable wall means to tend to maintain said wall means in said one position thereof.

References Cited

UNITED STATES PATENTS

| | | | |
|---|---|---|---|
| 2,292,401 | 8/1942 | Orre | 137—103 |
| 2,460,426 | 2/1949 | Maes | 137—104 XR |
| 2,652,847 | 9/1953 | Segebarth | 137—103 |
| 2,973,001 | 2/1961 | McAuley | 137—118 |

FOREIGN PATENTS 213,429   2/1958   Australia.

ROBERT G. NILSON, Primary Examiner

U.S. Cl. X.R.

91—50; 137—103; 251—15